April 5, 1960 G. W. MERRITT ET AL 2,931,672
FLEXIBLE DUCT MOUNTING
Filed June 5, 1956 2 Sheets-Sheet 1
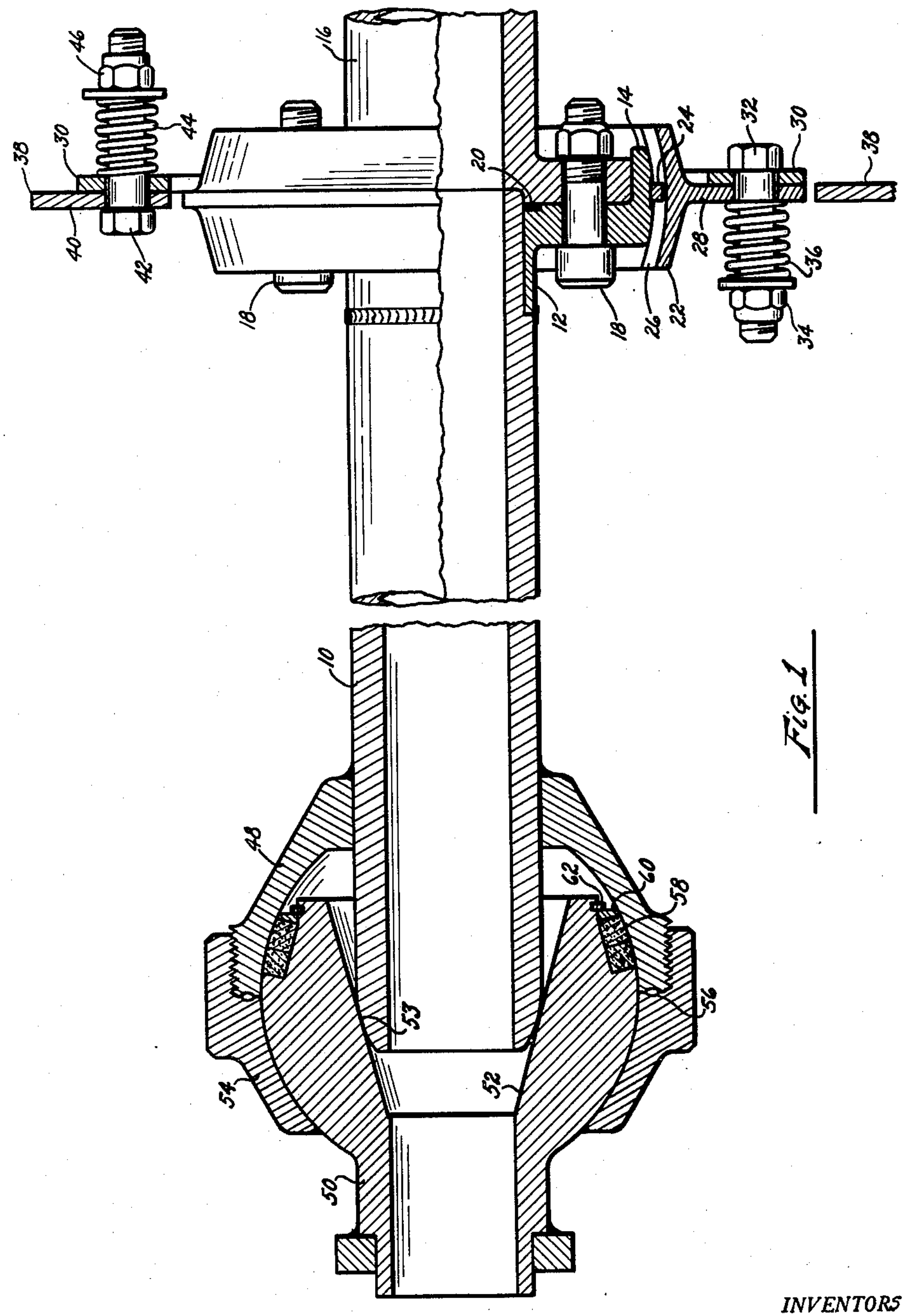
INVENTORS
GEORGE W. MERRITT & JOSEPH J. YUHAS
BY Wade Koontz and Arnold H. Cole
ATTORNEYS FLEXIBLE DUCT MOUNTING
Filed June 5, 1956 2 Sheets-Sheet 2
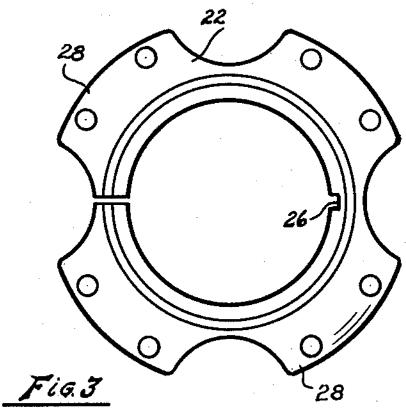
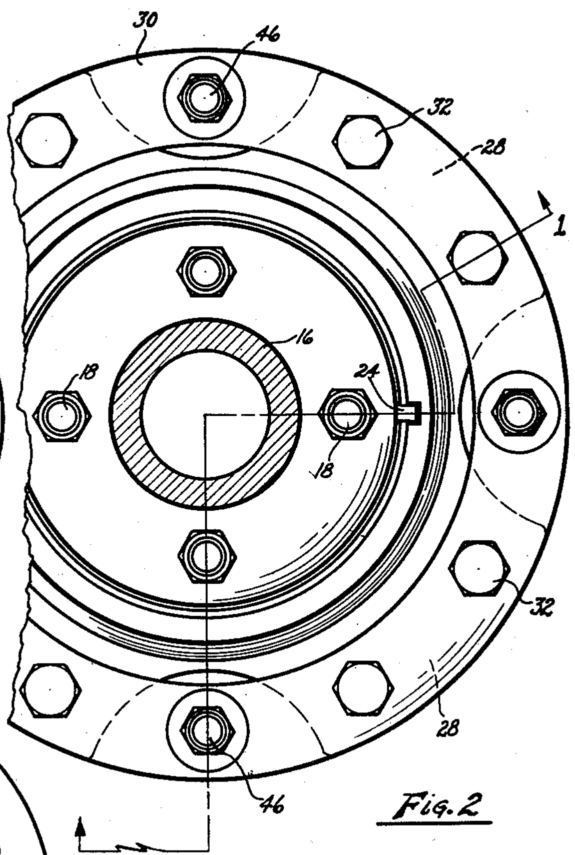
Fig.4
30
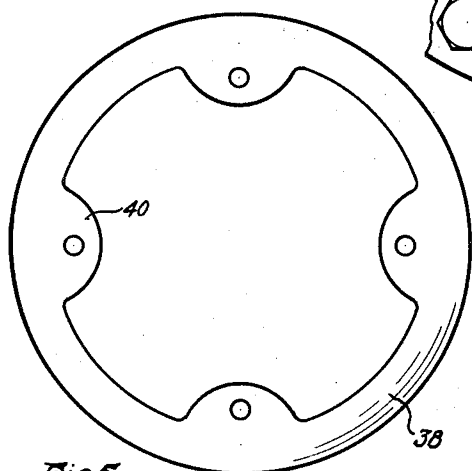
INVENTORS
GEORGE W. MERRITT & JOSEPH J. YUHAS
BY Wade Koontz
Arnold H. Cole
ATTORNEYS United States Patent Office 2,931,672
Patented Apr. 5, 1960

2,931,672

FLEXIBLE DUCT MOUNTING

George W. Merritt, Nutley, and Joseph J. Yuhas, Belleville, N.J., assignors to the United States of America as represented by the Secretary of the Air Force Application June 5, 1956, Serial No. 589,569
4 Claims. (Cl. 285—160)

The invention relates to a mounting means for fluid ducts and is more particularly concerned with providing such means with the flexibility necessary to compensate for duct movements.

In installations such as aircraft engines and the like the fluids carried by the associated ducts often reach temperatures as high as 3000° F. under pressures up to 1000 pounds per square inch. These factors, combined with high flow velocity, produce serious vibrations along the ducts. At the same time the extreme temperatures cause expansion and contraction of the ducts.

When employed to convey fluids between remote points, it is customary to support a duct at spaced points along its length. These supports usually take the form of a mounting to some conveniently located fixed structure. However, when said duct carries fluids under the conditions enumerated above, the movements of the duct caused by said conditions have been found to damage and often destroy the mountings. This may be attributed to the fact that such mountings are not provided with some means to absorb the stresses and strains imposed upon them. Although some mountings presently in use may provide for vibrations while others may provide for temperature changes, no single satisfactory means has been devised to provide for both said conditions.

It is therefore an object of our invention to provide new and improved duct mounting means.

More specifically, it is an object of our invention to provide a duct mounting which has the flexibility necessary to compensate for both vibration and temperature changes in the duct.

Another object of the invention is to provide a mounting which will eliminate damage yet still be simple and inexpensive to construct.

The above and still further objects, advantages, and features of the invention will become apparent upon consideration of the following detailed description of a single embodiment thereof, especially when taken in conjunction with the accompanying drawings, wherein:

Figure 1 shows a length of duct mounted in accordance with our invention, portions of the duct and mounting being shown in section taken on the line 1—1 of Figure 2;

Figure 2 is a partial end view as seen from the mounting end of Figure 1; and

Figures 3, 4 and 5 are plan views of the split ring, ring plate and mounting plate respectively, the elements being angularly oriented as they would be for assembly.

Turning now to the drawings in which like characters of reference indicate like parts, Figure 1 shows the mounted duct section at 10. A circumferential portion at one end of the duct section 10 is cut away to form a shoulder, and a flanged connector 12 is fitted on said shoulder and welded to said duct. Extending outwardly from the flange on connector 12 is a lip 14. The outer surface of said lip 14 is arcuate in shape for a purpose to be later described. Another section 16 of the duct rests on the inner surface of the lip 14 and is fastened to the flange of the connector 12 by a plurality of bolt and locknut assemblies 18. A portion of the flange is recessed to receive a copper asbestos gasket 20 which forms a seal between the duct sections.

The arcuate outer surface of the lip 14 cooperates with a split ring 22 having a complementary arcuate inner circumference as best seen in Figure 3. A key 24 formed on the lip 14 slides in a longitudinal keyway 26 in the split ring 22 to prevent relative rotation of these members. Four ears 28 extend from the ring 22, and an annular steel ring plate 30 is connected to said ears. The connection is flexible and comprises a plurality of bolts 32 which pass through the plate 30 and then ring 22. Locknuts 34 are threaded onto the bolts 32, and a compression spring 36 surrounds each bolt between its locknut and the ring 22. The force of each of said springs may be adjusted by rotation of the locknut which it abuts.

In order to mount the duct sections, a fixed mounting plate 38 is provided. This plate may be formed integral with, or may be rigidly attached to, the installation in which the ducts are to be used. As best seen in Figure 5 the outer periphery of the plate 38 is shown to be circular. However, it should be apparent that such a surface can take any desirable shape without affecting the flexibility of the device. The inner periphery of the mounting plate has four ears 40 thereon. When assembling the device, the ears 40 should be positioned to correspond to the recesses formed between the ears 28 on the split ring 22.

The ring plate 30 is attached to said ears 40 on the mounting plate 38 in the same manner in which said ring plate is attached to the split ring 22. Bolts 42 pass through the ears 40 of the mounting plate and then through the plate 30. Compression springs 44 react between said latter plate and locknuts 46 which adjust the spring force. It should be noted at this point that the threaded ends of the bolts 32 and 42 extend in diametrically opposite directions from the ring plate 30.

In order to insure flexibility in the duct itself, a universal connection is provided at the other end of the section 10. This connection comprises an adapter 48 welded to the section 10 near said other end. A portion of the inner surface of said adapter is spherical in shape. A third duct section 50 has a spherical outer surface at one end thereof, and the internal surface of said section 50 is outwardly flared at 52 to receive said other end of section 10. The latter is slightly rounded at 53 to provide a smooth sliding face in contact with said flared end 52. A nut 54, also having a spherical inner surface, is threaded onto the adapter 48 and these two members cooperate with the outer spherical surface on the section 50 to permit swiveling of the joint. A sealing gasket 56 is compressed between the adapter 48 and the nut 54 to prevent leakage at said joint. A pressure packing is also provided between the duct section 50 and the adapter. An annular section of the spherical surface of the section 50 is cut away and a packing cord 58 is received in the groove thus formed. A pressure plate 60 abuts said cord, and the former is held in place by a retaining ring 62. Fluid leaking past the surfaces 52 and 53 acts upon the plate 60 to compress the packing cord 58. This serves to increase and insure sealing action at that point.

The duct sections 10, 16 and 50 form a part of a line conducting fluids between a source and a point of use. When the line is installed and flow of fluid commences, the flexibility features of our invention come into play. If expansion of the section 10 occurs due to a rise in temperature, said section will cause movement of the ring 22 and the plate 30 against the springs 44. The mounting plate 38 will not be stressed in any way since the ears 28 of the ring 22 will pass through the recesses between the ears 40 on said plate 38. Alternatively, if section 10 contracts due to a drop in temperature, the ring 22 will be moved in the opposite direction away from the plate 30 and against the springs 36. Again the complementary ears and recesses on the plate 38 and the ring 22 preclude interaction therebetween. Thus changes in duct length due to temperature variations in either sense are absorbed by the expansible arrangement, and damage to the mounting is prevented.

Vibration of the duct with respect to the mounting is taken care of by the cooperating surfaces on the lip 14 and the ring 22. The spherical contours of these surfaces form a universal connection, and said members are thereby permitted relative swiveling motion without the imposition of tension on either of them. It should be noted that the key 24 and the keyway 26 restrain such motion only to the extent necessary to prevent misalignment of the ears and the recesses on the split ring and the mounting plate. Vibration of the duct sections with respect to each other is also provided for by one or more universal connections such as that described between sections 10 and 50.

It is to be understood that the above-described arrangement is merely illustrative of the applications of the principles of the invention. Numerous other arrangements may be devised by those skilled in the art without departing from the spirit and scope of the invention.

What is claimed is:

1. Movement-compensating mounting means comprising a conduit, a split ring surrounding a portion of said conduit, a universal connection between said split ring and said conduit, said connection including a key on said conduit and a cooperating longitudinal keyway on said split ring, a fixed mounting structure surrounding said ring, a connector member interposed between said ring and said structure, a plurality of inwardly extending spaced ears on said structure, a plurality of outwardly extending spaced ears on said ring, said ears being angularly positioned so that those on the split ring cover the spaces between those on the mounting structure, first longitudinally expansible means connecting said member to the ears on said ring, and second longitudinally expansible means connecting said member to the ears on said structure.

2. Mounting means as defined in claim 1 wherein the first expansible means comprises a set of bolts passing through said member and thence through the ears of said split ring, said second expansible means comprising another set of bolts passing through the ears on said structure and thence through said ring member, a spring and an adjusting nut on each bolt of both of said sets, the springs on the first-named set being compressed against said split ring while the springs on the other set are compressed against said member.

3. A device for mounting a fluid line on a fixed structure comprising a duct, a member surrounding a portion of said duct, a universal connection between said duct and said member, said universal connection including a spherical outer portion on said duct and a cooperating spherical surface on said member, there being a key on said duct surface which engages a longitudinal keyway on said member surface, a fixed mounting element surrounding said member, a ring plate positioned between said member and said element, a plurality of spaced ears on the outer periphery of said member, a plurality of spaced ears on the inner periphery of said mounting element, longitudinally expansible spring devices connecting said member to said plate, and other longitudinally expansible spring devices connecting said plate to said element, said spring devices passing through said ears for connecting said member and said element to the ring plate, the ears on the member being positioned to overlay the recesses formed between the ears on the mounting element whereby movement of either said member or said element will be independent of the other.

4. Movement-compensating mounting means comprising a conduit, a split ring concentric with said conduit, a universal connection between said split ring and said conduit, said universal connection comprising coacting arcuate surfaces on said conduit and said split ring, a fixed mounting structure around said ring, an annular connector positioned between said ring and said structure, a plurality of resilient means expansible along the longitudinal axis of said conduit, some of said resilient means connecting said ring to said connector, and the remainder of said resilient means connecting said structure to said connector, a plurality of outwardly extending spaced ears on said split ring, and a plurality of inwardly extending spaced ears on said structure, the ears on said split ring being angularly positioned to cover the spaces formed between the ears on said structure, said ears being the points of connection between said connector and both said ring and said structure.

References Cited in the file of this patent

UNITED STATES PATENTS

| | | |
|---|---|---|
| 1,063,389 | Robbins | June 3, 1913 |
| 1,626,772 | Worden | May 3, 1927 |
| 2,185,450 | Wager | Jan. 2, 1940 |
| 2,368,727 | Robinson | Feb. 6, 1945 |
| 2,502,322 | Iredell | Mar. 28, 1950 |
| 2,621,850 | Firth | Dec. 16, 1952 |